United States Patent [19]

Keller

[11] 4,097,217
[45] Jun. 27, 1978

[54] METHOD FOR CONVERTING COMBUSTOR FROM HYDROCARBONACEOUS FUEL TO CARBONACEOUS FUEL

[75] Inventor: Leonard J. Keller, Dallas, Tex.

[73] Assignee: The Keller Corporation, Dallas, Tex.

[21] Appl. No.: 748,939

[22] Filed: Dec. 9, 1976

[51] Int. Cl.² .......................................... F23D 11/44
[52] U.S. Cl. ..................................... 431/11; 48/202;
48/210; 48/11; 431/2
[58] Field of Search .................... 48/210, 197 R, 211,
48/202; 431/2, 3, 11

[56] References Cited

U.S. PATENT DOCUMENTS

| | | | |
|---|---|---|---|
| 3,746,522 | 7/1973 | Donath | 48/202 |
| 3,753,671 | 8/1973 | Leas et al. | 48/210 |
| 3,890,111 | 6/1975 | Knudsen | 48/197 R |
| 3,905,745 | 9/1975 | Konda | 431/2 |
| 4,011,058 | 3/1977 | Johnson et al. | 48/197 R |
| 4,031,030 | 6/1977 | Rudolph | 48/210 X |

*Primary Examiner*—Edward G. Favors
*Attorney, Agent, or Firm*—Wofford, Felsman, Fails & Zobal

[57] ABSTRACT

A method of converting a combustor from hydrocarbonaceous fuel to carbonaceous fuel characterized by the following multi step process. Oxygen-enriched gas is provided and the carbonaceous fuel is burned in a primary combustor in the presence of the oxygen-enriched gas to produce a high temperature, combustible product gas comprising carbon monoxide and hydrogen and produce a molten slag in the bottom that contains materials that would normally polute the atmosphere in a low temperature combustion process. The slag is withdrawn from the primary combustion chamber. Inert gas is employed to isolate and cool the explosive product gas and transfer the heat to a second combustion-supporting gas, such as air being supplied to the combustor. The less hot product gas is passed to the combustor and burned in the heated air. The waste gases that are produced by burning the product gas of carbon monoxide and hydrogen have much lower concentrations of pollutants therein. The pollutants can be removed by conventional processes, such as, introducing a reactant dust thereinto and collecting the dust at a downstream, cooler, point. Also disclosed are specific details and equipment modifications enabling carrying out the process.

5 Claims, 1 Drawing Figure

U.S. Patent  June 27, 1978  4,097,217
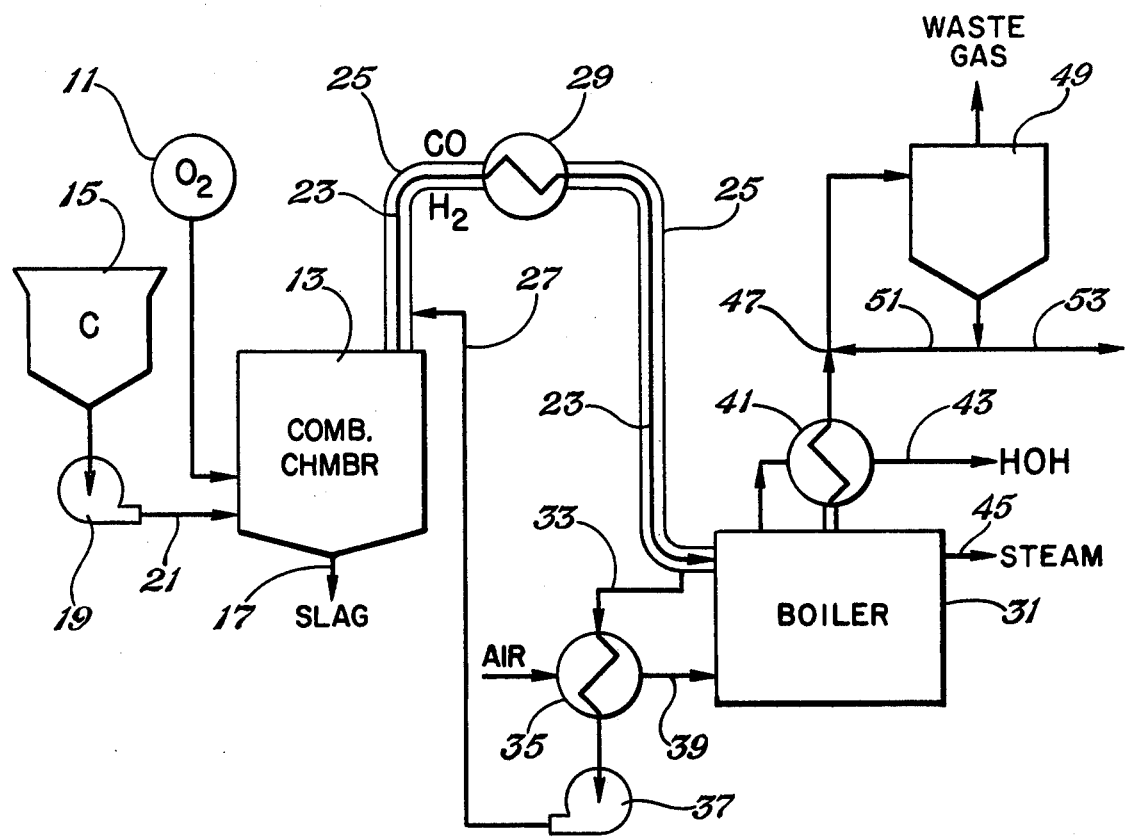

METHOD FOR CONVERTING COMBUSTOR FROM HYDROCARBONACEOUS FUEL TO CARBONACEOUS FUEL

BACKGROUND OF THE INVENTION

1. Field of the Invention

This invention relates to a method of converting a combustor from burning a hydrocarbonaceous fuel such as natural gas to burning a carbonaceous fuel such as coal.

The prior art has seen the proliferation of combustors burning hydrocarbon fuels, such as natural gas. Recently, however, circumstances have emphasized that the world's economically available hydrocarbons have been discovered, developed, exploited, used and wasted at an alarming rate during the past century. These hydrocarbons, considered so vital in today's energy market, are rapidly diminishing and the cost and political significance of hydrocarbon deposits have dramatically altered the use patterns. If the industrialized nations are to survive the crises and avoid economic disaster or becoming subject to those nations that have large hydrocarbon deposits, the basic concepts in using energy sources must change. Expressed otherwise, the carbonaceous fuels must be able to be employed instead of the hydrocarbonaceous fuels.

One of the greatest deterrents standing in the way of converting combustors, such as steam boilers and furnaces, from hydrocarbonaceous fuels to carbonaceous fuels is the large capital investment required to phase out an oil-fired or gas-fired facility and replace it with a new coal-fired or lignite-fired facility. Yet, the latter type facilities provide the greatest potential for high volume reductions in hydrocarbon consumption in the near future.

The second major deterrent slowing the conversion process is the environmental problems associated with burning coal or lignite. Thus the capital costs, operating costs, secondary environmental costs, and high energy losses associated with solving the basic environmental problems make conversion slower than otherwise desirable.

It is desirable that a method for converting a combustor from hydrocarbonaceous fuels to carbonaceous fuels have the following features not heretofore provided by the prior art.

a. It is desirable that the carbonaceous fuel be converted to a high temperature gas, as opposed to enrichment by increasing hydrogen content or by hydrogenation to try to form hydrocarbons artificially, which is an expensive process.

b. It is desirable to employ two-stage combustion, yet make efficient use of the heat even in the primary combustion chamber so that the total efficiency approximates that of burning the carbonaceous fuel directly.

c. It is desirable that some form be employed for removal of the pollutants in a primary combustion chamber, rather than having the pollutants discharged in the waste gases from the combustor.

d. It is desirable that safety be increased and the danger of explosions be eliminated if the two-stage combustor is employed to generate carbon monoxide and hydrogen or other dangerous gases.

e. It is desirable that the process require less capital investment, yet still enable employing the conventional process for treating waste gases, steam and the like; for example, reducing the pollutants in the waste gases.

SUMMARY OF THE INVENTION

Accordingly, it is an object of this invention to provide an environmentally acceptable method that converts hydrocarbonaceous combustors to carbonaceous combustors at reasonable costs and provides one or more of the foregoing features delineated as being desirable and not heretofore provided.

It is the specific object of this invention to provide an economical, environmentally acceptable method for converting hydrocarbonaceous combustors to carbonaceous combustors and providing all of the features delineated hereinbefore as desirable and not hereinbefore provided by the prior art.

These and other objects will become apparent from the descriptive matter hereinafter, particularly when taken in conjunction with the appended drawing.

In accordance with this invention there is provided a method of converting a hydrocarbon-fired combustor to burn a carbonaceous fuel comprising the following multistep process. An oxygen-enriched first combustion supporting gas is provided to a primary combustion chamber. The carbonaceous fuel is burned in the presence of the first oxygen-enriched combustion supporting gas in the primary combustion chamber to produce a high temperature, combustible product gas comprising carbon monoxide and hydrogen and a molten slag that contains materils that would in a normal low temperature combustion process be a pollutant and pass out with the waste gases. The slag is withdrawn from said primary combustion chamber. The slag may be sold, converted to commercial products or otherwise disposed of as economy dictates. The product gas is isolated and cooled with an inert gas that is non combustion supporting, simultaneously heating said inert gas. The cooler product gas is passed to the combustor. The heated inert gas is passed in heat exchange relationship with a second combustion supporting gas to heat the second combustion supporting gas and simultaneously cool the inert gas. The heated second combustion supporting gas is passed to the combustor and the product gas is burned in the combustor to produce a waste gas. The waste gas is low in pollutants, since most have been removed in the slag.

BEIEF DESCRIPTION OF THE DRAWING

The FIGURE is a schematic flow diagram of one embodiment of this invention.

DESCRIPTION OF THE PREFERRED EMBODIMENT(S)

The following descriptive matter will be given with respect to an embodiment of this invention in which a steam boiler is converted from natural gas to burn coal or lignite.

As delineated hereinbefore, a vital step in this invention is providing an oxygen-enriched first combustion supporting gas to a primary combustion chamber. The oxygen-enriched first combustion supporting gas may comprise oxygen alone. Hence, the plant 11 for producing the oxygen-enriched, combustion supporting gas is labeled $O_2$ in the FIGURE. If oxygen alone is employed, as will usually be the case, the oxygen-producing plant may comprise either an air reduction plant or an electrolysis of water plant. If desired, of course, the oxygen can be combined with a portion of air to produce the oxygen-enriched combustion supporting gas. In any event, the objective is to produce a higher temperature in the primary combustion chamber 13, as will be delineated in more detail hereinafter.

If the oxygen producing plant is an air reduction plant, nitrogen will be produced as a byproduct. The nitrogen may be liquefied or sold for any of the conventional purposes, such as high pressure nitrogen in bottles for providing an inert atmosphere or the like. A portion of the nitrogen can be employed as the inert gas in this invention, if desired. If the oxygen plant is a water reduction plant, as by the electrolysis of water, hydrogen will be a byproduct. The hydrogen may be marketed separately, or may be burned in the combustor. Ordinarily, it will have a high enough value on the market to be sold for any of the conventional commercial processes or purposes.

Another vital step is providing the carbonaceous fuel. The carbonaceous fuel-producing source 15 is labeled C in the drawing. It may comprise coal, lignite, Methacoal or "CHC fuel". The trademark name Methacoal designates a shear thinning, stable suspensoid fluid fuel consisting primarily of particulate materials derived from coal suspended in alcohols and soluble materials. Methacoal can be supplied as if it were a fluid, or liquid. Methacoal is described and claimed in my co-pending patent application Ser. No. 615,697, entitled "Fuel Composition and Method of Manufacture", filed Sept. 22, 1975; and the descriptive matter of that application is embodied herein by reference for details omitted herefrom. The designation "CHC fuel" is employed to connote a high-quality, dry, powdered, low-density carbonaceous-hydrocarbonaceous material separated from Methacoal by removing the volatilizable materials as gases, leaving the non-volatilized carbon-hydrocarbon materials as solids. The CHC fuels are particularly preferred if they comprise fuels from which sulfur and other normal pollutants have been at least partially removed so as to reduce the pollutants. In any event, the carbonaceous fuel is burned under controlled conditions, but at a slightly positive pressure near atmospheric in the primary combustion chamber 13 (COMB. CHMBR) in the presence of the oxygen-enriched combustion supporting gas.

The primary combustion chamber 13 will be a carbon-lined or refractory-lined combustion chamber or furnace. The carbonaceous fuel is burned with the oxygen-enriched combustion supporting gas, preferably oxygen alone, to obtain a high temperature within the primary combustion chamber. Because the oxygen is carefully controlled, the product gas is principally carbon monoxide and hydrogen. If desired, higher temperatures may be obtained by burning at least part of the carbonaceous fuel to carbon dioxide but this is made at a sacrifice of the combustibility of the product gas so it should be done only as needed. The temperature in the primary combustion chamber 13 is high enough to fuse and partially liquefy the fly ash and other ash forming materials so they are agglomerated and collected by cyclonic action within the furnace to form a slag pool at the bottom of the primary combustion chamber 13. The molten slag is withdrawn by suitable slag tapping means 17. The slag contains materials that would normally be pollutants, or contaminants, in a conventional low temperature combustion process, such as in the boiler.

If the carbonaceous fuel to be burned is coal or lignite, these materials should be dried and pulverized by conventional methods and conveyed or delivered to the fuel storage facility, or carbon producing source, 15. The pulverized fuel may be fed into the combustion chamber by any suitable means. However, the means selected should convey only minimal amounts of either air or inert gas into the primary combustion chamber 13. Such conveyors may be either conveying augers or linked flite conveyors with silicon carbide treated components or made from other high temperature resistant materials. If desired, the coal may be fed via a limited-volume air stream, as shown in the FIGURE The air stream is represented schematically by blower 19 delivering air and fuel through a pipe or conduit 21. Of course, the blower 19 is preferably located or positioned upstream of the hopper and the coal is fed into suitable aspirating and fluidizing means in accordance with conventional technology. All of these means are conventional and have been employed in coal-fired apparatus heretofore, so they do not require detailed descriptions herein.

In order to control the temperature, the ratio of oxygen to carbon is controlled. More specifically, the reaction:

$$C + \tfrac{1}{2} O_2 \rightarrow CO \qquad (I)$$

produces much less heat energy per pound of carbonaceous fuel than the reaction:

$$C + O_2 \rightarrow CO_2 \qquad (II)$$

Thus, increasing the amount of oxygen will consequently increase the combustion gas temperature. Conversely, lowering the oxygen will decrease the combustion gas temperature, and the resulting temperature inside the primary combustion chamber 13. Infrequently there may be described further reductions in temperature in the primary combustion chamber 13 below that which is effected by use of the minimum amount of oxygen required for complete conversion of the particulate fuel to gases. In that event, low-temperature inert combustion gases from the boiler of process waste exhaust gas stream may be recirculated through the primary combustor 13 to lower the temperature.

The temperatures in the primary combustion chamber should ordinarily range from about 2000° to 3000° F. If desired, additives may be used to affect the slagging characteristics of the ash-forming materials, to facilitate removal of the slag or to affect the quality of the basic characteristics of the slag product.

The slag product may be foamed to form a lightweight aggregate or may be cooled and then crushed, or otherwise formed into a marketable product, such as building blocks or the like.

The hot product gases from the primary combustion chamber 13 will be predominantly carbon monoxide, with minor amounts of carbon dioxide, water vapor, hydrogen, nitrogen and trace elements. Since the carbon monoxide is a very explosive and dangerous gas if not handled properly, great care must be exercised in designing and safeguarding the facility. In addition, of course, the hot hydrogen gases also contribute to the danger of explosion.

The product gases are taken out through conduit 23. Because of the danger of explosion, the conduit 23 is enclosed by a shroud, or jacket, 25 into which is passed inert gas, as through conduit 27. The inert gas may comprise any gas that will not support combustion or otherwise present a hazard. For example, it may comprise nitrogen; spent combustion gases; or the more expensive gases such as helium, neon, argon, or the like.

The inert gas is passed in heat exchange relationship with the hot product gas in heat exchanger 29. Thus, the inert gas cools the hot product gas and is, in turn, heated.

More specifically, the hot product gas comprising carbon monoxide is taken from a vertical cylindrical vortex tube, or riser, that extends upwardly from the center of a cylindrical or circular body of the primary combustion chamber 13. The gas is cooled as it leaves the furnace by the inert gas surrounding the vortex tube and contained and circulated in the jacket 25. If there is appreciable distance, the heat exchanger 29 may be inherent in the length of jacketed pipe. On the other hand, the suitable heat exchanger, per se, can be employed to increase the surface area for heat transfer. Preferably, the inert gas is monitored for carbon monoxide to check for leaks or the like. Moreover, the inert gas may be monitored to see if air is leaking into the inert gas.

A vital step in the process is the passing of the cooled product gas to the combustor, such as the burner of the boiler 31 for burning, as discussed in more detail later hereinafter.

The heated inert gas is passed, as by conduit 33 and heat exchanger 35, in heat exchange relationship with a second combustion supporting gas, such as air. Thus, the heat absorbed by the inert gas in heat exchange relationship with the hot product gases is, in turn, imparted to heat the combustion air for the boiler 31. Consequently, this invention conserves the heat energy ordinarily lost when coal is converted to water gas or other low enthalpy gases, then cooled, transported, stored and used for subsequent burning as a fuel. The heat of primary combustion delivered as heat in the product gas combined with the heat imparted to the second combustion supporting gas renders this method almost as efficient from an energy point of view as burning the coal directly.

The cool inert gas is re-cycled; or circulated by suitable fan, or compressor, 37 into the conduit 27 and, thence, to the jacket 25.

The pre-heated air is passed to the boiler 31 through conduit 39 to serve as the second combustion supporting gas for burning the cooled but still hot product gas. By controlling the amount of heat transferred from the hot product gas to the air, both gases may be near their optimum temperatures for most efficient combustion in the boiler 31. One advantage of this invention is that the combustor, or fire box of the pre-existing boiler or furnace will almost always be large enough for completing combustion of this fuel, since the over-all combustion efficiency is so good. There will be substantially less nitrogen in the exhaust gases than if air had been used for both primary and secondary combustion. Consequently, less heat is wasted in the waste gas, or exhaust gas, in the form of heated nitrogen.

One of the advantages of this invention is that any of the processes and equipment found advantageous hereinbefore can be employed in this invention to improve the operation of the boiler. For example, accoutrements 41, such as economizers, may be employed to improve the over-all efficiency of the process. As is understood, water is fed to the boiler through suitable line 43 and the generated steam is taken away through line 45. Of course, conventional water treating facilities, service tanks, pre-heaters, economizers, or super heaters may be employed in accordance with the conventional processes, but these need not be described in detail herein.

In this process, the formation of nitrogen oxides is reduced substantially, since there is very little or no nitrogen present in the product gas from the primary combustion chamber 13, except the minor proportion that may be present in the coal. The combustion of carbon monoxide with pre-heated air will be rapid and will tend to reduce the nitrogen oxide formation. Recirculation of the waste gas to the secondary combustor, or boiler, will have little adverse effect on burning of carbon monoxide in air, therefore, exhaust gas may be recirculated as a further means of reducing the nitrogen oxides levels in the waste gas with minimum effect on combustion efficiency.

Ordinarily, no exhaust gas particle removal is necessary, since practically all particulate matter will have been removed in the liquid slag. Non-turbulent cyclonic stack bases should be adequate for guarding against the inevitable scaling off of small amounts of materials from the boiler tubes, furnaces walls, ducts and the like. If necessary, however, chemical additives may be used to effect the desired reduction in the exhaust gas sulfur oxide levels by fixing the sulfur compounds in a solid form so they can be removed along with other slag forming materials, either in the primary combustion chamber or in the waste gases.

If the sulfur content of the coal, lignite, or CHC fuel is so high that sulfur oxides removal is required from the waste gases from the boiler 31, a conventional process may be employed. If desired, a dust such as sodium carbonate, commercially available as Nahcolite, can be added at a particular point, as at point 47. The Nahcolite ties up the sulfur dioxide and other acid gases. The Nahcolite dust is then moved in a conventional apparatus 49, such as a cyclone separater and simple bag house. The exhaust gas, or waste gas, is relatively dry, so there is no danger of dew point condition causing plugging of the bags. This operation facilitates using low condenser pressures for improved turbine efficiency. Since there is no dust load from the ash, the solid Nahcolite or the like can be recycled through conduit 51 instead of reheating the gas stream as a means for keeping efficiency of the Nahcolite use high. Since the Nahcolite is substantially free of fly ash, the portion that is not recycled and extracted via conduit 53 may be sold as a commercially useful material, for example, as a fertilizer.

In this invention, it is preferred to employ the CHC fuels derived from Methacoal to insure controlling the sulfur oxide emissions in most cases, since the Methacoal processes remove the sulfur bearing materials prior to combustion. For high sulfur coals, it is preferable to use the Methacoal processes for pre-combustion removal of sulfur oxide forming minerals, and for dry removal of the sulfur oxides use Nahcolite gas treatment after combustion.

Since the exhaust gases from this invention are relatively free of particulate contaminantes, chemical processes are available for removal of the sulfur oxides to allow recovery of elemental sulfur or marketable sulfur compounds, rather than the worthless sludges from limestone scrubbers or the like.

While the preceding examples that have been described herein are believed to afford adequate detail for complete understanding of the invention, it is to be borne in mind that this invention may be employed for any combustor, as in a furnace or the like and not for boilers alone.

This invention provides a high temperature gas to the combustor as opposed to enrichment of fuel by increasing its hydrogen content or by hydrogenation to hydrocarbons and then burning.

Secondly, this invention employs a two stage combustion for the burning and yet achieves a combustion efficiency almost as good as burning the coal directly.

Moreover, this invention achieves total slagging of the ash forming materials under controlled conditions at high temperature in the primary combustion chamber.

The invention uses inert gas in a specific manner to provide both heat exchanging capability to improve the efficiency of the process while simultaneously maintaining the safety of handling of the product gas with its hot carbon monoxide and hydrogen.

Also, this invention deliberately provides low particulate content exhaust gases with low moisture content to facilitate obtaining low exit gas temperatures for high thermal efficiency and to simultaneously remove the restrictions which high dust loading and high moisture content place on the use of bag houses and solid dust such as Nahcolite ore as a means for removing sulfur oxides and the like.

Accordingly, it can be seen that this invention provides all of the objects delineated hereinbefore.

Although this invention has been described with a certain degree of particularly, it is understood that the present disclosure is made only by way of example and that numerous changes in the details of construction and the combination and arrangement of parts of may be resorted to without departing from the spirit and the scope of the invention.

What is claimed is:

1. A method of converting a hydrocarbon-fired combustor to burn a carbonaceous fuel comprising the steps of:
   a. providing an oxygen-enriched first combustion supporting gas to a primary combustion chamber;
   b. burning the carbonaceous fuel in the presence of said first oxygen-enriched combustion supporting gas in said primary combustion chamber to produce a high temperature, combustible product gas comprising carbon monoxide and hydrogen and a molten slag that contains materials that would in a normal lower temperature combustion process be pollutants and pass out with the waste gases;
   c. withdrawing said slag from said primary combustion chamber;
   d. isolating and cooling said product gas with an inert gas that will not support combustion and simultaneously heating said inert gas;
   e. passing the cooler product gas to said originally hydrocarbon-fired combustor;
   f. passing the heated said inert gas in heat exchange relationship with a second combustion supporting gas to heat said second combustion supporting gas and simultaneously cool said inert gas;
   g. passing the heated said second combustion supporting gas to said previously hydrocarbon-fired combustor and burning said product gas in said combustor to produce waste gases;

such that the atmospheric polutants in the waste gases are reduced by having removed said slag, and the danger of explosion is reduced by said inert gas isolating said product gas.

2. The method of claim 1 wherein said inert gas is recycled after being passed in heating exchange relationship with said second combustion supporting gas to again isolate and cool said product gas.

3. The method of claim 1 wherein an acid-gas removing dust is added to said waste gas for removal of polluting waste gases therefrom, said dust is collected at a downstream point.

4. The method of claim 1 wherein the carbonaceous fuel is CHC fuel having had much of the moisture, ashforming mineral particles and inorganic sulphur-bearing mineral particles removed and having been separated from the volatilizable materials.

5. The method of claim 1 wherein the carbonaceous fuel is a shear-thinning liquid suspensoid of coal in alcohol delivered to the primary comsutor as a fluid fuel.

* * * * *